United States Patent
Passero et al.

(10) Patent No.: US 7,577,900 B2
(45) Date of Patent: Aug. 18, 2009

(54) MECHANISM FOR MAINTAINING DATA FORMAT SYNCHRONIZATION BETWEEN DIFFERENT ENTITIES

(75) Inventors: Gary A. Passero, Penfield, NY (US); Hong Q. Li, Rochester, NY (US); Adzim Raja Auzar, Fairport, NY (US); James E. Muoio, Jr., Batavia, NY (US)

(73) Assignee: Harris Corporation, Melbourne, FL (US)

( * ) Notice: Subject to any disclaimer, the term of this patent is extended or adjusted under 35 U.S.C. 154(b) by 627 days.

(21) Appl. No.: 11/128,864

(22) Filed: May 13, 2005

(65) Prior Publication Data

US 2006/0259909 A1 Nov. 16, 2006

(51) Int. Cl.
G06F 17/00 (2006.01)
(52) U.S. Cl. .................................. 715/200; 715/249
(58) Field of Classification Search ................ 715/500, 715/523, 522, 200, 248, 249
See application file for complete search history.

(56) References Cited

U.S. PATENT DOCUMENTS

| | | | | |
|---|---|---|---|---|
| 5,608,874 | A * | 3/1997 | Ogawa et al. | 709/246 |
| 5,911,776 | A * | 6/1999 | Guck | 709/217 |
| 6,385,606 | B2 * | 5/2002 | Inohara et al. | 707/4 |
| 6,571,285 | B1 * | 5/2003 | Groath et al. | 709/223 |
| 6,643,652 | B2 | 11/2003 | Helgeson et al. | 707/10 |
| 6,845,380 | B2 * | 1/2005 | Su et al. | 707/102 |
| 6,947,162 | B2 * | 9/2005 | Rosenberg et al. | 358/1.15 |
| 6,985,901 | B1 * | 1/2006 | Sachse et al. | 707/10 |
| 7,089,330 | B1 * | 8/2006 | Mason | 709/246 |
| 7,403,956 | B2 * | 7/2008 | Vaschillo et al. | 707/104.1 |
| 2002/0070753 | A1 * | 6/2002 | Vogel et al. | 326/37 |
| 2002/0073119 | A1 * | 6/2002 | Richard | 707/513 |
| 2002/0075496 | A1 * | 6/2002 | Zhang et al. | 358/1.13 |
| 2002/0147748 | A1 * | 10/2002 | Huang et al. | 707/517 |
| 2003/0007179 | A1 * | 1/2003 | Ferlitsch | 358/1.16 |
| 2003/0120593 | A1 * | 6/2003 | Bansal et al. | 705/39 |
| 2003/0179315 | A1 * | 9/2003 | Collins et al. | 348/441 |
| 2003/0225920 | A1 * | 12/2003 | Bussler et al. | 709/310 |
| 2004/0172484 | A1 * | 9/2004 | Hafsteinsson et al. | 709/246 |
| 2004/0261023 | A1 * | 12/2004 | Bier | 715/530 |

(Continued)

OTHER PUBLICATIONS

Myllymaki, Effective Web Data Extraction with Standard XML Technologies, ACM May 2001, pp. 689-696.*

(Continued)

Primary Examiner—Cong-Lac Huynh
(74) Attorney, Agent, or Firm—Allen, Dyer, Doppelt, Milbrath & Gilchrist, P.A.

(57) ABSTRACT

A software data interface technique allows a program to retrieve data from another program, whether or not data formats employed by the two programs are mutually compatible. An application-independent data format, $F_{exchange}$, is a priori agreed upon and readable by creators of the two programs. In the course of storing data during execution of a first program, that data file is augmented to include instructions that convert the format of the data into the application-independent intermediate data format, $F_{exchange}$. During execution of the second program, whenever access of data stored in the first program is required, the second program retrieves from the first data file instructions for converting the format of the data to the application-independent intermediate data format, $F_{exchange}$. The second program then executes the conversion instructions so as to retrieve the data from the first program.

19 Claims, 5 Drawing Sheets

U.S. PATENT DOCUMENTS

| | | | |
|---|---|---|---|
| 2005/0076296 A1* | 4/2005 | Lee et al. | 715/523 |
| 2005/0091589 A1* | 4/2005 | Ramarao | 715/522 |
| 2005/0114405 A1* | 5/2005 | Lo | 707/200 |
| 2005/0213133 A1* | 9/2005 | Shibata et al. | 358/1.13 |
| 2005/0229099 A1* | 10/2005 | Rogerson et al. | 715/523 |
| 2005/0234852 A1* | 10/2005 | Coramutla | 707/1 |
| 2005/0273860 A1* | 12/2005 | Chess et al. | 726/25 |
| 2006/0004719 A1* | 1/2006 | Lawrence et al. | 707/3 |
| 2006/0007466 A1* | 1/2006 | Ben-Yehuda et al. | 358/1.13 |
| 2006/0031763 A1* | 2/2006 | Yeung | 715/523 |
| 2006/0100989 A1* | 5/2006 | Chinchwadkar et al. | 707/3 |
| 2006/0232813 A1* | 10/2006 | Henry et al. | 358/1.15 |
| 2006/0242563 A1* | 10/2006 | Liu et al. | 715/513 |
| 2007/0220159 A1* | 9/2007 | Choi et al. | 709/230 |
| 2007/0239726 A1* | 10/2007 | Weiss et al. | 707/10 |
| 2008/0281871 A1* | 11/2008 | Wong | 707/200 |
| 2009/0024642 A1* | 1/2009 | Vaschillo et al. | 707/100 |

OTHER PUBLICATIONS

Varlamis et al., Bridging XML-Schema and Relational Database. A System for Generating and Manipulating Databases Using Valid XML Documents, ACM Nov. 2001, pp. 105-114.*

Lie et al., Multipurpose Web Publishing Using HTML, XML, and CSS, ACM 1999, pp. 95-101.*

Timmerer et al., Interoperable Adaptive Multimedia Communication, IEEE 2005, pp. 74-79.*

* cited by examiner

┌─ 301 ─────────────────────────┬─ 311 ─────────────────────────────────────┐

301: A PUBLIC INTERFACE TO ACCESS DATA STORED IN FILES GENERATED BY $A_1$ IS DEFINED, PUBLISHED AND DISTRIBUTED TO THE MAKERS OF $A_2$.

THE INTERMEDIATE XML FORMAT CONFORMED TO BY THE PUBLIC INTERFACE QUERIES CAN BE DEFINED USING ANY APPROPRIATE MEANS, INCLUDING (BUT NOT LIMITED TO) XML SCHEMA, DTD OR EXAMPLE XML TREE FRAGMENTS:

311: HARRIS VHF UHF RADIO PROGRAMMING APPLICATION (RPA) PUBLIC INTERFACE IS DEFINED TO INCLUDE SIX DATA QUERIES:

QUERY#1.
   Name:"Station General Query"
   Version: 1.0
   Type: XSLT
   Output Schema:
   <Result>
       <RadioStation name="aStationName">
           <Type>RF-5800V</Type>
           <Modem>Internal</Modem>
           <SerialNumber>N/A</SerialNumber>
       </RadioStation>
   </Result>

QUERY#2.
   Name:"Network General Query"
   Version: 1.0
   Type: XSLT
   Output Schema:
   <Result>
       <RadioNetwork name="aNet">
           <MemberStation>aStationName</MemberStation>
       </RadioNetwork>
   </Result>
   •
   •

302: $A_2$ IS MODIFIED, ACCORDING TO THE STEPS OF THIS INVENTION (III.2 AND III.5 ABOVE), AND IN CONFORMANCE TO THE WELL-KNOWN PUBLIC INTERFACE (IV.1 ABOVE), TO ACCESS DATA FROM FILES GENERATED BY $A_1$.

314: HARRIS WIRELESS MESSAGING TERMINAL (WMT) WILL USE BOTH THE "Station General Query" AND "Network General Query"

303: SPECIFICALLY, THE DATA SOUGHT BY $A_2$, CAN BE OBTAINED BY EXECUTING ONE OR MORE OF THE QUERIES IN THE PUBLIC INTERFACE SUPPORTED BY $A_1$. COMBINING THE DATA FROM THESE MULTIPLE QUERIES WILL PROVIDE $A_2$ WITH THE FULL DATA SET NEEDED.

304: $A_2$ IS NOW CAPABLE OF IMPORTING DATA FROM $A_1$ ACCORDING TO THE STEPS OF THIS INVENTION.

*FIG. 3A*

| | |
|---|---|
| 310 | 320 |
| FOR EACH ENTRY-POINT IN THE PUBLIC INTERFACE, $A_1$ APPENDS CONVERSION INSTRUCTIONS TO THE END OF THE USER DATA (WITHIN THE FILE).<br><br>THESE INSTRUCTIONS ARE CAPTURED IN THE FORM OF XSLT STYLESHEETS, AND ARE CONTAINED BY UNIQUELY IDENTIFIED XML NODES WITHIN THE XML DOCUMENT.<br><br>EACH STYLESHEET IS SPECIFICALLY CRAFTED SO AS TO TRANSFORM THE DATA FROM THE SCHEMA USED BY THE FILE CONTAINING THE STYLESHEET ITSELF INTO THE INTERMEDIATE SCHEMA DEFINED & PUBLISHED IN STEP IV.1.<br><br>THE STYLESHEETS FROM TWO DIFFERENT VERSIONS OF THE SAME APPLICATION WILL BE DIFFERENT TO THE DEGREE THAT THE SCHEMA USED BY EACH VERSION OF THE APPLICATION TO CAPTURE THE DATA IS DIFFERENT.<br>331 | XML NODES LIKE THE FOLLOWING ARE CREATED AFTER THE USER DATA IS WRITTEN TO THE FILE:<br><br>```<br><CDQ name="Network General" type="xsl" ver="1.0"><br> <xsl:stylesheet xmlns:xsl="http://www.w3.org/1999/XSL/Transform"<br>    xmlns="http://www.harris.com/rfcd/acg"<br>    version="1.0"><br>  <xsl:param name="arg1" select=""/><br>  <xsl:output method="xml" indent="yes"/><br>  <xsl:template match="/"><br>   <xsl:element name="Result"><br>    <xsl:if test="$arg1 =''"><br>     <xsl:apply-templates select="/Plan/Networks/Network"/><br>    </xsl:if><br>    <xsl:if test="$arg1 !=''"><br>     <xsl:apply-templates select="//Network[Name=$arg1]"/><br>    </xsl:if><br>   </xsl:element><br>  </xsl:template><br>  ⋮<br> </xsl:stylesheet><br>```<br>342<br>341 |
| $USER_1$ DISTRIBUTES THE FILE TO $USER_2$.<br>332 | THE FILE IS SENT VIA EMAIL FROM THE COMMUNICATIONS OFFICER IN ONE BRANCH OF THE MILITARY TO A COMMUNICATIONS OFFICER IN ANOTHER BRANCH IN THE MILITARY. |
| $USER_2$ EXECUTES APPLICATION $A_2$.<br><br>333 | THE 2nd COMMUNICATIONS OFFICER LAUNCHES RF-6010 NETWORK MANAGEMENT APPLICATION (NMA) ON HIS PC:<br> — 352<br>343 |
| $USER_2$ INSTRUCTS $A_2$ TO LOAD DATA FROM FILE OBTAINED FROM $USER_1$. | THE 2nd COMMUNICATIONS OFFICER CLICKS THE LOAD FILE  ICON ON THE TOOLBAR, AND SELECTS THE FILE "Plan1.vpd"<br>353 |
| $A_2$ SEARCHES THE FILE, LOOKING FOR THE ENTRY-POINTS OF INTEREST AS IDENTIFIED BY XML NODES WITH EXPECTED ATTRIBUTES WITHIN THE XML DOCUMENT.<br>334 | THE NMA LOCATES THE XML NODE IN THE DOCUMENT WHICH CONTAINS THE NETWORK GENERAL QUERY USING THE XPATH QUERY:<br><br>//CDQ[@namE='Network General'] [@type='xsl'] [@ver='1.0']<br>354<br>344 |

FIG. 3C

MECHANISM FOR MAINTAINING DATA FORMAT SYNCHRONIZATION BETWEEN DIFFERENT ENTITIES

FIELD OF THE INVENTION

The present invention relates in general to communication systems and subsystems thereof, and is particularly directed to a software data interface technique that allows a first communication application program to retrieve data from a second communication application program, irrespective of whether or not the data formats employed by the two communication application programs are mutually compatible.

BACKGROUND OF THE INVENTION

The communications industry has available to it a number of software application programs that allow an operator to model a radio communication network. As a non-limiting example, the Radio Programming Application (RPA) software application created by Harris Corp.—the assignee of the present application—captures data supplied by an operator, the data typically including details such as, but not limited to, exact radio names, radio types, RF network connectivity, IP network connectivity, telephony network connectivity and the like. Many of these details are also needed by other radio communication software applications, such as but not limited to Harris Wireless Message Terminal (WMT), Harris Tactical Chat® IP and Harris RF-6010 Network Management Application, each of which is operated by the assignee of the present application. One brute force and very time consuming mechanism to configure each application with the parameters necessary for its operation would be to have a user enter all of the necessary data into each application.

SUMMARY OF THE INVENTION

In accordance with the present invention, there is provided a communication software data interfacing technique that significantly relieves the above user burden, by means of a software data interface or intermediate data conversion mechanism that makes data available in an application-independent data format previously agreed to by users of multiple applications. To this end, the supplier of shared data provides an agreed to set of known entry points for accessing the shareable data in the same file as the data itself. In accordance with preferred, but non-limiting, embodiment, the well known entry points employ XML (extensible markup language) nodes with an agreed upon labeling convention. These nodes may be identified as CDQ (which is an abbreviation of the phrase "common data query," which is a technical abbreviation for this method). Each node has a plurality of attributes, including a version ("version"), a type ("type") and a name ("name"). Thus, an example of a node would be the statement: <CDQ name="Station General Query" type="xsl" version="1.0">. The set of named queries that is included with any given data set is agreed to by both the supplier and the consumer of the shared data. The consumer agrees to access the data in the file exclusively through this set of 'intermediate' queries, rather than directly retrieving the data.

Given this set of queries for representing access points for a respective set of data, a consumer may access the data by opening the data file and then locating the query of interest, using the "name", "type" and "version" identifiers previously agreed upon during a preliminary contract negotiation session among all users of the technique. In addition, the consumer decompresses contents of the node using an agreed upon compression/decompression standard. For queries of type "XSL", the result of the decompression step is an extensible stylesheet language template (XSLT) stylesheet through which the entire data file is to be processed (using the consumer's choice of XSLT processor). This stylesheet, together with any consumer supplied arguments, is defined as a "Query Input." The result of XSLT processing of the Query Input is termed a "Query Output." For XML type queries, the result of the decompression step is the Query Output directly. The consumer then extracts the data from the Query Output and closes the data file.

More particularly, considering an overview of the methodology of the present invention, as a first step, an arbitrary first version of a first application program stores shared data that is needed by a second application program. Within the first version of the first application program, data is stored in a first format. For an updated or more recent version of the first of application program, data is stored in a corresponding updated format. For successful data exchange between programs, the second application program must be data exchange-compatible with the first application program. Namely, it is necessary for the second application program to be able to read the data files generated by the first application program, irrespective of the version of the first application program. This means that the second application program must be able to retrieve data from files stored in any format, which could be generated by some version of the first application program. For this purpose an application-independent 'intermediate' data format, termed $F_{exchange}$ is agreed upon by the creators of all application programs that will have access to the shared data. To this end, the second application program is created to 'read' data in this agreed upon intermediate data format $F_{exchange}$. A key feature of the present invention is the fact that whenever a data file is created by the first application program, associated instructions necessary to convert from any arbitrary format to the $F_{exchange}$ format are inserted into the data file generated by the particular version of the first application program. These conversion instructions are accessible by the second application program upon accessing the data file of interest. Then, whenever the second application program needs to read data that has been generated by the first application program, the second application program retrieves intermediate $F_i$-to-$F_{exchange}$ conversion instructions that were created and inserted within that data file contained within the first application program and proceeds to execute the conversion steps described by those instructions, thereby successfully accessing the data from the first application program.

BRIEF DESCRIPTION OF THE DRAWINGS

FIGS. 3A-3D form a process flow diagram of the steps of the present invention that provides a non-limiting example of various technical parameters associated with reading data employed in a radio communication network in implementing the steps of the flow diagram of FIG. 2.

DETAILED DESCRIPTION

Figure 1:
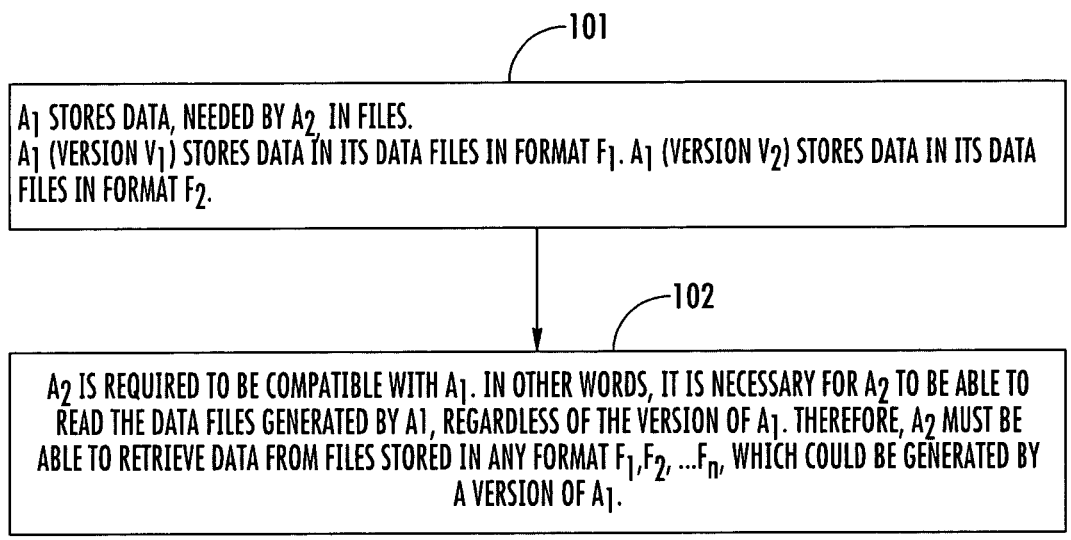
FIG. 1 is a flow chart showing a general overview of the shared data interface employed by the present invention for the case of two arbitrary application programs $A_1$ and $A_2$, which do not necessarily have data exchange compatibility with one another.

Before detailing the application independent shared data retrieval methodology for fully synchronously interfacing data between disparate (radio communication) application programs in accordance with the present invention, it should be observed that the invention resides primarily in a prescribed novel software program that is readily executed via conventional digital processing circuits and components. Consequently, the configurations of such circuits and components and the manner in which they may interface with radio equipment making use of the invention have been shown in the drawings by readily understandable flow charts and associated block diagrams, which show only those specific aspects that are pertinent to the present invention, so as not to obscure the disclosure with details which will be readily apparent to those skilled in the art having the benefit of the description herein. Thus, the flowcharts and diagrammatic illustrations are primarily intended to show the major components of the invention in convenient functional groupings, whereby the present invention may be more readily understood.

Attention is initially directed to FIG. 1, which is a flow chart showing a general overview of the shared data interface employed by the present invention for the case of two arbitrary application programs $A_1$ and $A_2$, which do not necessarily have data exchange compatibility with one another. It should be understood that the invention is not limited to use with only two or any other number of application programs. The number two has been selected as a non-limiting example, to facilitate an understanding of the principles and operation of the invention without unduly burdening the textual description. It will be readily understood that the invention can be readily expanded to a larger number of users of the shared data by implementing the routine described herein among respective pairs of users, so long as all users are included.

Figure 2:
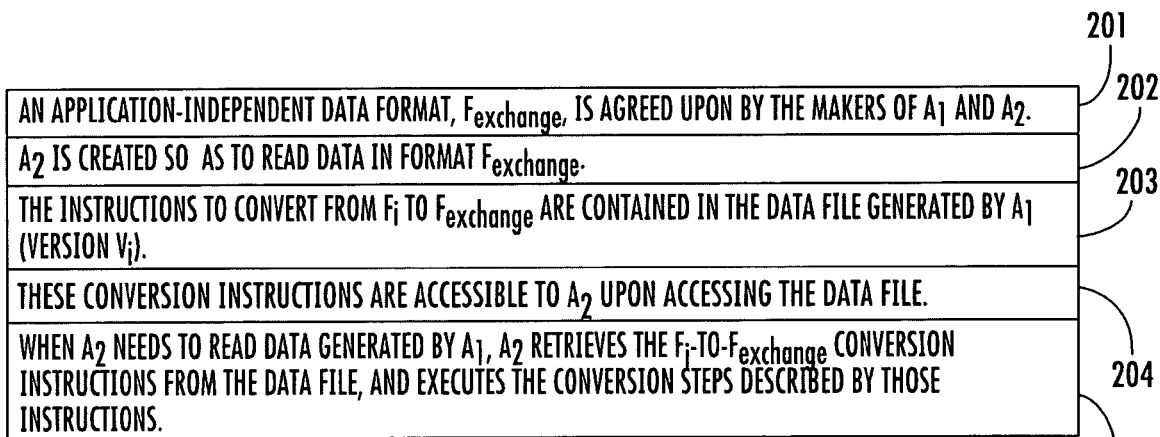
FIG. 2 depicts a routine through which a program $A_2$ is able to retrieve data from files stored in any of the formats ($F_1$, $F_2$, ..., $F_N$) which could be generated by some version of program $A_1$, in particular showing details necessary for the steps 101 and 102 of the overview flow diagram of FIG. 1 to be successfully completed.
Figure 3B:
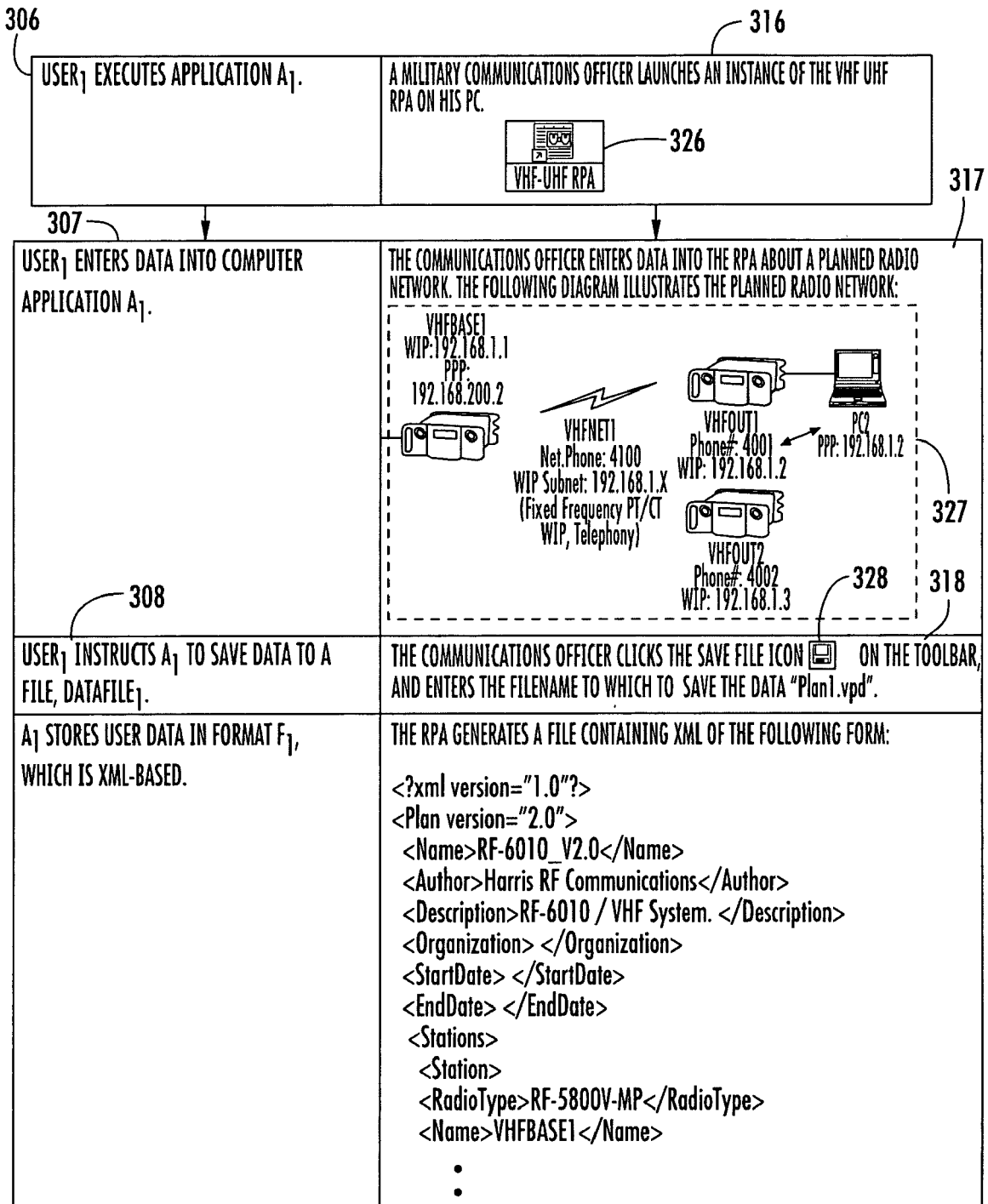
Figure 3D:
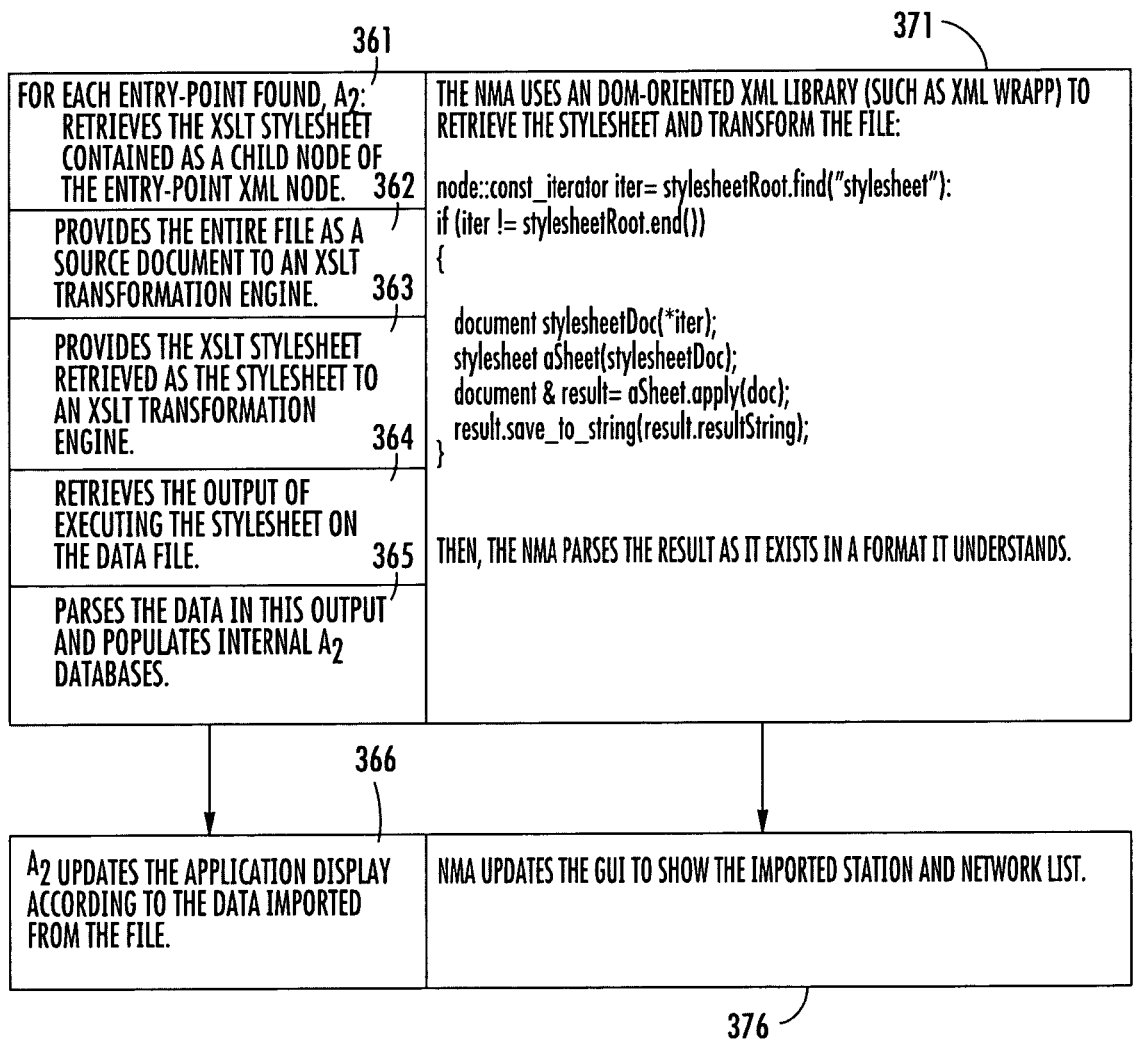

Initially, as a first step 101, an arbitrary first version $V_1$ of the first application program $A_1$ stores, in various files, shared data that is needed by one or more other applications, here by the second application program $A_2$. Within version $V_1$ of application program $A_1$, data is stored in a first format $F_1$. For an updated version $V_2$ of program $A_1$ data is stored in an associated updated format $F_2$. As pointed out above, the second application program $A_2$ is required to be data exchange-compatible with application program $A_1$; namely, as shown at step 102, it is necessary for program $A_2$ to be able to read the data files generated by program $A_1$, regardless of the version $V_i$ of program $A_1$. This means that in order for step 102 to be successfully executed, program $A_2$ must be able to retrieve data from files stored in any of the formats $(F_1, F_2, \ldots, F_N)$ which could be generated by some version of program $A_1$. In order for the steps 101 and 102 of the overview flow diagram of FIG. 1 to be successfully completed, the routine shown in FIG. 2 is executed.

At a first step 201, an application-independent 'intermediate' data format, $F_{exchange}$ is agreed upon by the creators of all application programs (programs $A_1$ and $A_2$ in the present example). In step 202 application program $A_2$ is created to 'read' data in this agreed upon intermediate data format $F_{exchange}$. Next, in step 203, whenever a data file is created by application program $A_1$, associated instructions necessary to convert from any arbitrary format $F_i$ to format $F_{exchange}$ are inserted into the data file generated by version $V_i$ of application program $A_1$. As represented by step 204, these conversion instructions are accessible by application program $A_2$ upon accessing the data file of interest. Then, whenever, as shown at step 205, application program $A_2$ needs to read data that has been generated by application program $A_1$, program $A_2$ retrieves the intermediate $F_i$-to-$F_{exchange}$ conversion instructions that were created and inserted within that data file, and proceeds to execute the conversion steps described by those instructions, thereby successfully accessing the data.

A non-limiting example showing the manner in various technical parameters associated with reading data employed in a radio communication network in implementing the steps of the flow diagram of FIG. 2 will now be described with reference to the flow diagram of FIGS. 3A-3D. At first step 301 (which corresponds to step 201 of the flow diagram of FIG. 2), a public interface used to access data stored in files generated by the first application program $A_1$ is defined, published and distributed to the makers of application program $A_2$. As a non-limiting example, in step 301 a VHF UHF Radio Programming Application (RPA) public interface provided by the assignee of the present application is generated to produce a set of data queries. For purposes of reducing the complexity of the present description only two of these queries are shown as Query #1 and Query #2 within intermediate format block 311. The format is an intermediate XML (extensible markup language) format conformed with by the public interface queries can be defined using any appropriate means, including (but not limited to) XML schema, DTD or example XML tree fragments.

Next, at step 302, application program $A_2$ is modified, in accordance with steps 202 and 205 described above with reference to FIG. 2 on the one hand, and in conformance with the public interface of step 301, to access data from the files generated by application program $A_1$, described above. Specifically, in step 303, the target data sought by application program $A_2$ is readily obtainable by executing one or more of the queries in the public interface supported by application program $A_1$. Then, in step 304, the data from these multiple queries is combined to provide application program $A_2$ with the full data set it needs. In particular, as shown at associated block 314, a Wireless Messaging Terminal (WMT) routine will use both the "Station General Query" (Query #1) and the "Network General Query" (Query #2) of query block 311 associated with the execution of step 301, described above. As a result of this data file access, application program $A_2$ is now capable of importing data from application program $A_1$, as shown at step 305.

At step 306, an arbitrary user (user$_1$) of application program $A_1$ executes that program. In practical terms this is shown at associated block 316, wherein a military communications officer launches an instantiation of the VHF UHF RPA on his personal computer (PC), as by clicking upon an associated icon 326. Next, at step 307, user$_1$ enters data into the application program $A_1$, that he is running on his PC. As diagrammatically illustrated in the example of block 317, the communications officer (user$_1$) enters data into the RPA about a planned radio network the components and operational parameters of which are shown as being surrounded by broken lines 327.

Next, at step 308, user$_1$ instructs his currently active application program $A_1$ to save data to a file "DataFile$_1$". This operation is represented in block 318 by the communications officer clicking on the "Save File" icon 328 on his PC's graphical user interface (GUI) toolbar, and enters the filename to which to save the data, which is denoted here as "Plan1.vpd." Next, in step 309, application program $A_1$ stores user data in format $F_1$ which, in the present example, is XML-based, as described above. As shown by block 319, the RPA generates a filed containing XML. Then, at step 310, pursuant to the invention, for each entry-point in the public interface, application program $A_1$ appends conversion instructions to the end of the user data (within the file). In addition, within step 310, these instructions are captured in the form of extensible style sheet language template (XSLT) stylesheets, and are contained by uniquely identified XML nodes within the XML document. As described briefly above, in accordance with the present invention, each stylesheet is specifically crafted so as to transform the data from the schema used by the file containing the stylesheet itself into the intermediate schema defined and published at step 301. It will be readily appreciated that the stylesheets from two different versions of the same application will differ to the degree that the schema used by each version $V_i$ of the application to capture the data is different. Block 320 shows the manner in which XML nodes may be created after the user has written to the file.

At step 331, $user_1$ distributes the file to $user_2$. In practical terms, as shown at block 341, the file is sent via email from a first communications officer at one location to a second communications officer at another location. Next, in step 332, $user_2$ proceeds to execute application program $A_2$. This is pragmatically represented by block 342, which diagrammatically illustrates the second communications officer ($user_2$) launching an (RF-6010) Network Management Application (NMA) on his PC by clicking on an associated ICON 352.

Following the launching of the second application program (Network Management Application in the present example), in step 333, $user_2$ instructs the application to load data from the file that has been obtained from $user_1$. This action is diagrammatically illustrated in block 343, by the second communications officer clicking on the load file icon 353 on the toolbar, and selecting the file of interest "Plan1.VPD." In response to this action, the routine transitions to step 334, wherein application program $A_2$ searches the file, looking for the entry-points of interest, as identified by XML nodes with expected attributes within the XML document. This action is diagrammatically illustrated in block 344. which depicts the NMA locating the XML node in the document which contains the Network General Query using the designated XPATH query shown at 354. For each entry point found, the second application program $A_2$ performs a number of operations 361-365, for which there is an associated result block 371, as follows.

As shown at step 361, the second application program $A_2$ retrieves the XSLT stylesheet contained as a child node of the entry-point XML node. At step 362, application program $A_2$ provides the entire file as a 'source' document to an XSLT engine. At step 363, the application program $A_2$ provides the XSLT stylesheet retrieved as the stylesheet to an XSLT transformation engine. At step 364, application program $A_2$ retrieves the output of executing the stylesheet on the data file of interest. At step 365, the second application program $A_2$ proceeds to parse the data in this output and populates internal $A_2$ databases.

Once steps 361-365 have been completed, then in step 366, the second application program $A_2$ will display the results based upon the data it has imported from the accessed file. This operation is diagrammatically illustrated at block 376, wherein the network management application updates the GUI to show the imported station and network list.

As will be appreciated from the foregoing description, the present invention is operative to relieve a user from having to reenter data for each of a plurality of different application programs that may share data, by means of a software data interface or intermediate data conversion mechanism that stores data in an application-independent data format previously agreed to by users of multiple applications. The supplier of the shared data provides an agreed to set known entry points for accessing the shareable data in the same file as the data itself. In accordance with preferred, but non-limiting, embodiment, the well known entry points may employ XML nodes with an agreed upon labeling convention. These nodes may be identified as "common data query" and each node has a plurality of attributes, including a "version", a "type" and a "name". The set of named queries that is included with any given data set is agreed to by both the supplier and the consumer of the shared data. The consumer agrees to access the data in the file exclusively through this set of 'intermediate' queries, rather than directly retrieving the data.

For this purpose an application-independent 'intermediate' data format, termed $F_{exchange}$ is agreed upon by the creators of all application programs that will have access to the shared data. To this end, a second application program is created to 'read' data in this agreed upon intermediate data format $F_{exchange}$. A key feature of the present invention is the fact that whenever a data file is created by a first application program associated instructions necessary to convert from any arbitrary format to the $F_{exchange}$ format are inserted into the data file generated by the particular version of the first application program. These conversion instructions are accessible by the second application program upon accessing the data file of interest. Then, whenever the second application program needs to read data that has been generated by the first application program, the second application program retrieves intermediate $F_i$-to-$F_{exchange}$ conversion instructions that were created and inserted within that data file contained within the first application program, and proceeds to execute the conversion steps described by those instructions, thereby successfully accessing the data from the first application program.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of enabling data stored in a file associated with a first application program $A_1$ to be read by a second application program that may not have data-sharing compatibility with said first application program, said method comprising:

(a) defining, a priori, an application-independent data format that is agreed upon by all consumer applications, including said first and second application programs, respectively;

(b) in the course of storing data in a first data file associated with the execution of said first application program, providing in said first data file instructions that are operative to convert the format of the data in said first data file to said application-independent data format;

(c) in the course of execution of said second application program, whenever access of data stored in said first file of said first application program is required, causing said second application program to retrieve from said first data file instructions for converting the format of the data in said first data file to said application-independent data format; and (d) causing said second application program to execute said retrieved instructions for converting the format of the data in said first data file to said application-independent data format thereby retrieving the data from said first application program.

2. The method according to claim 1, wherein step (c) comprises presenting one or more prescribed common data queries (CDQs) to said second application program from said first application program, and thereby causing said second application program to retrieve from said first data file instructions for converting the format of the data in said first data file to said application-independent data format.

3. The method according to claim 2, wherein a respective common data query includes at least one of a version, a type and a name of a node that may be used by said second application program to locate the data transformation instructions for said data.

4. The method according to claim 1, wherein step. (b) comprises, in the course of storing data in a first data file associated with the updating of said first application program, appending in said first data file an associated updated set of instructions that are operative to convert the format of the data in said first data file to said application-independent data format.

5. The method according to claim 1, wherein said application-independent data format corresponds to an extensible markup language (XML)-based format.

6. The method according to claim 1, wherein, in the course of executing steps (c) and (d), said second application program searches for entry points as identified by XML nodes, and wherein, for each entry point found retrieves an extensible stylesheet language template (XSLT) stylesheet as a child node of the entry point XML node, provides the entire file as a source document to an XSLT transformation engine, provides the retrieved XSLT stylesheet to the XSLT transformation engine, retrieves the output of executing the stylesheet on the data file, parses the data obtained from the file and enters the parsed data into a data file for said second application program.

7. The method according to claim 1, wherein data employed in the execution of said first and second application programs, respectively, includes one or more data entry items including a communication network configuration, types of communication devices employed in said network, transmit and receive frequencies of said communication devices, telephone numbers of various communication devices and internet protocol addresses of communication devices employable by said network.

8. In a data processing system for a communication network comprised of a plurality of communication sites, wherein data stored in a file associated with a first communication program employed by a first communication device at a first site may not have data-sharing compatibility with a second communication program employed by a second communication device at a second site, a method of enabling data stored in a file associated with said first communication program at said first site to be read by a second communication program at said second site, said method comprising:
(a) establishing said network such that all potential participants agree, a priori, on an application-independent data format that is readable by all participants of said network including said first and second communication programs, respectively;
(b) in the course of storing data in a first data file associated with the execution of said first communication program, providing in said first data file instructions that are effective to convert the format of the data in said first data file to said application-independent data format;
(c) in the course of execution of said second communication program, whenever access of data stored in said first file of said first communication program is required, causing said second communication program to retrieve from said first data file instructions for converting the format of the data in said first data file to said application-independent data format; and
(d) causing said second communication program to execute said retrieved instructions for converting the format of the data in said first data file to said application-independent data format thereby retrieving the data from said first communication program.

9. The method according to claim 8, wherein step (c) comprises presenting one or more prescribed common data queries (CDQs) to said second communication program from said first communication program, and thereby causing said second communication program to retrieve from said first data file instructions for converting the format of the data in said first data file to said application-independent data format.

10. The method according to claim 9, wherein a respective common data query includes at least one of a version, a type and a name of a node that may be accessed by said second communication program to retrieve said data.

11. The method according to claim 8, wherein step (b) comprises, in the course of storing data in a first data file associated with the updating of said first communication program, appending in said first data file an associated updated set of instructions that are operative to convert the format of the data in said first data file to said application-independent data format.

12. The method according to claim 8, wherein said application-independent data format corresponds to extensible markup language (XML) format.

13. The method according to claim 8, wherein, in the course of executing steps (c) and (d), said second communication program searches for entry points as identified by XML nodes, and wherein, for each entry point found retrieves an extensible style sheet language template (XSLT) stylesheet as a child node of the entry point XML node, provides the entire file as a source document to an XSLT transformation engine, provides the retrieved XSLT stylesheet to an XSLT transformation engine, retrieves the output of executing the stylesheet on the data file, a parses the data obtained from the file and enters the parsed data into a data file for said second communication program.

14. The method according to claim 8, wherein data employed in the execution of said first and second communication programs, respectively, includes one or more data entry items including the communication network configuration, types of communication devices employed in said network, transmit and receive frequencies of said communication devices, telephone numbers of various communication devices and internet protocol addresses of communication devices employable by said network.

15. A system for enabling data stored in a file associated with a first application program that is executable on said system from being read by a second application program that is also executable on said system but does not necessarily have data-sharing compatibility with said first application program, wherein a priori, an application-independent data format is agreed upon and is readable by said first and second application programs, respectively, said system including processing circuitry and being operative to;
(a) in the course of storing data, within a memory of the processing circuitry, in a first data file associated with the execution of said first application program, providing in said first data file instructions that are operative to convert the format of the data in said first data file to said application-independent data format;
(b) in the course of execution of said second application program by said processing circuitry, whenever access of data stored in said first file of said first application program is required, causing said second application program to retrieve from said first data file instructions for converting the format of the data in said first data file to said application-independent data format; and (c) causing said second application program to execute, via said processing circuitry, said retrieved instructions for converting the format of the data in said first data file to said application-independent data format thereby retrieving the data from said first application program.

16. The system according to claim 15, wherein step (b) comprises presenting one or more prescribed common data queries (CDQs) from said second application program to said first application program, and thereby causing said second application program to retrieve from said first data file instructions for converting the format of the data in said first data file to said application-independent data format.

17. The system according to claim 16, wherein a respective common data query includes at least one of a version, a type and a name of a node that may be accessed by said second application program to retrieve said data.

18. The system according to claim 15, wherein step (a) comprises, in the course of storing data in a first data file associated with the updating of said first application program, appending in said first data file an associated updated set of instructions that are operative to convert the format of the data in said first data file to said application-independent data format.

19. The system according to claim 15, wherein said application-independent data format corresponds to extensible markup language (XML) format, and wherein, in the course of executing steps (b) and (c), said second application program searches for entry points as identified by XML nodes, and wherein, for each entry point found retrieves an extensible style sheet language template (XSLT) stylesheet as a child node of the entry point XML node, provides the entire file as a source document to an XSLT transformation engine, provides the retrieved XSLT stylesheet to an XSLT transformation engine, retrieves the output of executing the stylesheet on the data file, a parses the data obtained from the file and enters the parsed data into a data file for said second application program.

* * * * *